United States Patent [19]

Kalala et al.

[11] Patent Number: 4,871,554
[45] Date of Patent: Oct. 3, 1989

[54] CALCIUM FORTIFIED FOOD PRODUCT

[75] Inventors: Rose H. Kalala, Orlando; Joe R. DeLeon, Longwood; Thomas P. Maculan, Apopka, all of Fla.

[73] Assignee: Coca-Cola Company, Atlanta, Ga.

[21] Appl. No.: 84,680

[22] Filed: Aug. 12, 1987

[51] Int. Cl.$^4$ .................................................. A23L 2/02
[52] U.S. Cl. ...................................... 426/74; 426/599
[58] Field of Search ......................... 426/74, 590, 599

[56] References Cited

U.S. PATENT DOCUMENTS

| | | | |
|---|---|---|---|
| 2,325,360 | 7/1943 | Ayers | 426/599 |
| 2,548,594 | 4/1948 | Edmonds . | |
| 2,567,038 | 8/1950 | Stevens et al. . | |
| 2,845,355 | 7/1958 | McColloch et al. . | |
| 3,030,213 | 4/1962 | Tidridge et al. . | |
| 3,114,641 | 12/1963 | Sperti | 426/599 |
| 3,227,562 | 1/1966 | Houghtaling | 426/599 |
| 3,395,021 | 7/1968 | Glicksman . | |
| 3,657,424 | 4/1972 | Aktins | 426/599 |
| 3,949,098 | 4/1976 | Bangert | 426/324 |
| 4,351,735 | 9/1982 | Buddemeyer et al. . | |
| 4,551,342 | 11/1985 | Nakel et al. | 426/548 |
| 4,622,227 | 11/1986 | Saleeb et al. . | |
| 4,722,847 | 2/1988 | Heckert | 426/74 |
| 4,737,375 | 4/1988 | Nakel et al. . | |
| 4,738,856 | 4/1988 | Clark . | |
| 4,740,380 | 4/1988 | Melachouris et al. . | |

FOREIGN PATENT DOCUMENTS 54-8767  1/1979  Japan ..................................... 426/74

Primary Examiner—Carolyn Paden
Attorney, Agent, or Firm—Kenyon & Kenyon

[57] ABSTRACT

A calcium fortified food product in the form of a ready-to-serve beverage, a frozen concentrate or a reconstitutable dry drink mix is disclosed which provides between 10%–100% of the U.S. RDA of a calcium per six fluid ounces, which has a pH of not more than about 4.5 and which has a Brix-acid ratio of about 5:1 to about 54:1. The product has a pleasant fruity taste, no harsh off-notes, no effervescence and no bitter after-taste.

48 Claims, No Drawings

CALCIUM FORTIFIED FOOD PRODUCT

BACKGROUND OF THE INVENTION

1. Field of the Invention

This invention relates generally to a calcium fortified food product in the form of a ready-to-serve beverage, a frozen concentrate or a reconstitutable dry drink mix which provides between 10%–100% of the U.S. RDA of calcium per six ounce serving, which has a pH of not more than 4.5 and which has a Brix-acid ratio range of about 5:1 to 54:1.

2. The Prior Art

Calcium is the most abundant component of minerals present in the human body, comprising approximately two percent of total body weight. Calcium is continuously utilized by the body and is replenished by a variety of food sources. The several uses of calcium in the body include providing rigidity to the skeletal framework; serving as a catalyst for the conversion of prothrombin to thrombin, a compound necessary for blood clotting; increasing cell membrane permeability; activating a number of enzymes including lipase and adenosine triphosphatase; and acting as a component in the mechanisms of neural transmission and muscular contraction.

Given these representative vital usages of calcium by the body, it is recognized that a dietary calcium deficiency can have adverse effects on an individual's health which vary in degree depending upon age and sex. For example, calcium deficiency can interfere with muscular contraction and can also result in depletion of skeletal calcium, resulting in thin and brittle bones.

This latter malady is known as osteoporosis. Osteoporosis (porous bones) is a deficiency disease, a condition in which there are varying degrees in the loss of bone density or actual bone loss. Adult bone loss is considered one of the most debilitating health problems for elderly people. Although bone loss occurs in both men and women as they age, women suffer more often and with more devastating effects. This is due in part to the fact that women, in general, have smaller skeletal structures than men and also undergo accelerated bone loss at menopause due to estrogen loss. This crippling disease affects approximately one out of four women over the age of 60. The bones become more susceptible to breaks; subsequent fractures have a lower chance of healing which often leads to fatal complications.

Several studies conducted in recent years have shown that increased dietary intake of calcium may be effective in minimizing bone loss in elderly or post menopausal women. It is thought that increased consumption of calcium in early years builds reserves that enable a greater tolerance of a negative calcium balance in later years.

Some researchers suggest that raising calcium intake to 1200 mg–1400 mg per day would help restore positive calcium balance in most women between the ages of 35 and 50. Other data indicate even higher levels up to 1900 mg per day may be effective for treating post menopausal women. Calcium intakes of up to 2500 mg per day are considered safe in most healthy individuals. These high levels, however, may not be beneficial and may result in hypercalcemia or kidney stones.

Foods fortified with calcium and calcium supplements are being used more often by the U.S. consumer and are generally considered by some researchers to offer the same net effect as calcium naturally found in food. The most effective order of relative bioavailability or intestinal absorption of various calcium salts is still controversial. There is no consensus among medical authorities as to the effectiveness of one calcium salt over another.

Nevertheless, there are several known factors which affect the absorption of calcium by the human body. In healthy adults approximately 30 percent of calcium contained in their diets is absorbed. The absorption of calcium from various foods may range from 10% to 40%. Generally, at very high intakes the efficiency of the absorption process decreases. The body's need is probably the most significant factor in controlling this absorption process through feedback mechanisms. Children and pregnant/lactating women absorb an average of 40% of the calcium in their diets.

Vitamin D (active) is the major regulator of intestinal absorption of calcium. Calcium intakes can therefore be more efficiently utilized when there is an abundant supply of vitamin D. Sunlight (ultraviolet light) is considered an important factor in the conversion of dietary precursors to vitamin D, especially for young people. The dietary sources of active vitamin D may become essential in elderly adults who are less likely to be exposed to sunlight.

Acid solutions enhance the solubility of calcium salts. Much of the digestion of foods takes place in the duodenum where the pH of the gastric juices is low. Since calcium salts are more soluble in an acid pH, much of the absorption of calcium takes place in this segment of the gastrointestinal tract. Tricalcium phosphate, calcium lactate, calcium carbonate and many other calcium compounds have all been used as calcium sources in various calcium fortified products. In "Nutrition and Metabolic Bone Disease With A Special Emphasis On The Role Of Calcium", Pak, C. Y. C., Medical Grant Rounds, Southwestern Medical School, Mar. 6, 1986, it is disclosed that calcium citrate is the preferred salt for calcium fortification in certain juices. Several commercially available products such as antacids disclose the use of calcium carbonate as a dietary calcium supplement.

The recommended daily allowance (RDA) of a mineral is the gender-specific recommendation considered by scientific experts to be adequate to meet the need for that nutrient for virtually all healthy people in the population. The current RDA of calcium is 360 to 800 mg for children depending on age. 12. The RDA for teenagers from 11–15 years is 1200 mg and is 800 mg for adults. Pregnancy and lactation increase the recommended amount by about 400 mg per day. The U.S. Recommended Daily Allowances (U.S. RDA) are derived from the 1968 RDA and are standards specified by the Food and Drug Administration to simplify nutritional labelling.

Dairy products are recognized as a rich source of dietary calcium, in some instances accounting for as much as 75% of an individual's dietary intake of calcium. Increased ingestion of dairy products, however, has several drawbacks which preclude their broad recommendation as a solution for dietary calcium deficiency. These drawbacks include lactose intolerance by some individuals; the high levels of cholesterol and cholesterol producing ingredients in dairy products; the high caloric yields of dairy products; and flavor off-tastes often experienced by elderly individuals.

Various beverages have been disclosed which contain a calcium compound in amounts which vary depending upon the purpose of the calcium additive.

U.S. Pat. No. 3,227,562 discloses a citrus fruit juice concentrate having a low Brix to acid ratio. As disclosed in the '562 patent, which is hereby incorporated by reference, the Brix unit is a commonly used unit of measurement which expresses the concentration of dissolved solids in an aqueous solution. The acid unit is the citric acid concentration in the citrus juice. The Brix to acid ratio is the accepted measurement of the sweetness to tartness ratio used in the fruit juice industry. A Brix-Acid ratio is obtained by dividing the Brix value by the acid value for a given product which yields a ratio compared with unity which forms a comparative scale for acceptability for particular juice concentrates. Brix-acid ratios of concentrated citrus fruit juice, high grade fresh—frozen orange juice concentrate will usually have a range of Brix-acid ratios of about 12.5:1 to about 20:1 whereas a range for grapefruit juice would be about 7:1 to about 11:1. Brix-acid ratios for commercially available citrus fruit juice-containing drinks generally range from 17:1 to 54:1. High quality commercially available orange juice products usually have a Brix-acid ratio range of 16:1 or higher.

The '562 patent attributes the characteristic aftertaste of its concentrate to a combination of salts comprising sodium chloride, magnesium chloride, calcium chloride and sodium silicate with a citrus concentrate comprised of orange, lemon grapefruit and lime. The level of calcium chloride contained in the concentrate of the '562 patent is in the range of 3 mg per 6 ounce serving with the bulk of the salt used to impart the pleasant aftertaste consisting of sodium chloride. This level provides an extremely low amount of calcium and will not deliver the requisite dietary amounts of calcium thought to be effective in the prevention of osteoporosis and the like.

U.S. Pat. No. 3,657,424 discloses a citrus juice energy supplement which replenishes salts whose natural level in the body has been depleted, e.g., through exercise. This reference discloses the addition of a combination of salts, including sodium chloride, potassium chloride and calcium chloride, in amounts that do not exceed 0.2% percent by weight of the beverage. The calcium chloride present in the fruit juice disclosed in the '424 patent ranges from 0–0.04% by weight or approximately 30 mg of calcium per 6 ounce serving of fortified product.

In U.S. Pat. No. 4,551,342 a beverage containing specific cation-edible acid mixtures for improved flavor retention is disclosed in which the flavor of carbonated sugar-or aspartame-sweetened beverages is improved by using a specific ratio of acids to cations. The acids used are citric, malic, succinic and phosphoric and the cations used are calcium, magnesium and potassium. The '342 patent discloses the use of calcium carbonate and calcium hydrogen malate as sources of calcium. These sources of calcium are added in amounts which range from 0.04–0.12% by weight of the final beverage, which corresponds to about 29–83 mg of calcium per six ounce serving. This level also provides only a low dietary amount of calcium.

Attempts to increase the calcium levels in these prior art beverages produce an unpleasant gritty drink. Moreover, at calcium levels in the drink that are needed to promote significant absorption levels in the gut, the calcium salts begin to exhibit precipitation.

Consequently, it is an object of the present invention to develop a calcium fortified food product in ready-to-serve and readily ingestible form which can provide a substantial amount and a readily absorbable form of the recommended daily allowance of calcium. In particular, it is an object to develop a food product, e.g., a beverage, which can provide approximately 100 mg–1,000 mg of calcium per six ounce serving and which has a Brix-acid ratio of about 5:1 to about 54:1, preferably about 7:1 to about 20:1 for citrus products. A further object is the development of a food product which can be handled as a concentrate yet is fairly soluble in water and, when reconstituted, has a pH which does not exceed the upper levels for high acid food, e.g. about 4.5.

SUMMARY OF THE INVENTION

In accordance with the present invention a calcium fortified food product is disclosed which provides between 10%–100% of the U.S. RDA of calcium. In particular, the food product of the present invention can comprise a ready-to-serve beverage, a frozen concentrate or a reconstitutable dry concentrate which provides between 10%–100% of the U.S. RDA of calcium per six ounce serving. A calcium-fortified beverage prepared in accordance with the present invention has a pH which does not exceed about 4.5 when it is reconstituted (i.e. in a single strength form) and Brix-acid ratio in a range of about 5:1 to about 54:1, preferably about 7:1 to 20:1 for citrus products. The beverage having these characteristics has distinct pleasant aftertaste and substantially no gritty mouth-feel. Any acidic fruit juice material, preferably citrus juices, can be used in the formulation of the concentrates and beverages of the invention.

The source of calcium contained in the food product of the present invention is a salt blend of between about 50%–0% (by weight relative to total calcium from the salts) of tribasic calcium phosphate and about 20%–50% (by weight relative to total calcium from the salts) of calcium lactate. The quantity of salt blend present in the food product is that which yields from about 100 mg to about 1000 mg of calcium per six fluid ounces of beverage. A preferred salt blend ratio is about 65–75% of calcium phosphate and about 25–35% calcium lactate. A preferred quantity of salt blend yields about 300 mg of calcium per six fluid ounces of beverage.

The present invention also relates to calcium fortified beverages which comprise about 70–97% water, about 2–28% by weight of concentrated fruit juice, and about 1–5% by weight of a salt blend of about 50–80% of tribasic calcium phosphate and about 20–50% of calcium lactate, by weight of total calcium. In preferred embodiments, the calcium fortified beverages comprise about 70–80% water, about 12–25% concentrated fruit juice, and 2–4% of the calcium component.

The present invention also relates calcium fortified beverage concentrates comprising water, concentrated fruit juice and the aforementioned calcium component. In preferred embodiments, the concentrates comprise about 95–98% by weight of a mixture consisting of about 20–33% by weight of water and about 66–80% by weight of concentrated fruit juice, and about 2–5% by weight of the aforementioned calcium component. The calcium component is substantially dissolved to form a concentrate which is frozen.

BRIEF DESCRIPTION OF A PREFERRED EMBODIMENT

In an especially preferred embodiment of the present invention a salt blend of approximately 75% by weight, relative to total calcium, of tribasic calcium phosphate and about 25% by weight, relative to total calcium, of calcium lactate is added to a concentrated fruit juice according to the amounts listed in Table 1. The concentrated fruit juice chosen in this embodiment is orange juice, although any other single fruit juices such as juice from grapefruit, lemons, limes, tangerines, grapes, apples, nectarines, peaches, pears, cherries, cranberries, strawberries, mangos, bananas, kiwis, plums, blueberries, and the like can be used. Citrus fruits could be used and would still result in a beverage product having an acceptable pH, such as less than 4.5. This pH maintains the product as a high acid food. The composition of the salt blend can also be preferably varied between 65%–75% by weight of tribasic calcium phosphate and 25%–35% by weight of calcium lactate. The pH of the food product of the present invention does not exceed about 4.5 even at 100% of the U.S. RDA calcium fortification levels.

Preparation of the especially preferred calcium fortified orange juice of the present invention involves the steps of determining the U.S. RDA level of calcium desired; addition of the calcium salt blend to water; gentle agitation of the solution of salt blend and water until partial solubility of the salt blend in water is achieved; addition of preblended orange juice concentrate and flavoring components and continued agitation until the salt blend is completely dispersed. Alternatively, if fresh, single strength juice is to be combined, the salt therein can be mixed with a portion of the fresh juice, and then with continued agitation, the remaining portion can be added.

The preferred salt blend and fruit juice concentrate containing the ingredients listed in Table I provides a beverage which contains about 300 mg of calcium per six ounce serving. This preferred beverage will deliver approximately 30% of the U.S. RDA for calcium. With the salt blend of the invention, the calcium is present, at least partially, in organically complexed forms. These forms help promote absorption of calcium in the gut. In addition, a six fluid ounce serving of the preferred calcium fortified orange juice or citrus juice product provides about 100% of the U.S. RDA for ascorbic acid. Another feature of the present invention is that the indigenous nutrients present in orange or citrus juice are not significantly affected by calcium salt addition. The blend of calcium phosphate, calcium lactate and citrus juice according to the invention is also essentially free from harsh or bitter taste, effervescence during manufacture or when consumed, calcium salt precipitation and calcium salt overnote flavor. In contrast, blends of other calcium salts and citrus juice usually exhibit such undesirable qualities and produce the characteristic bitter overnote of a calcium salt taste. The characteristic sharp, clean, fruity, citrus taste of the beverage according to the invention is, therefore, surprising.

TABLE I

Composition of an Example of a Calcium Fortified 100% Juice Product in Ready-to-Serve Form

| Ingredients | Grams per quart |
| --- | --- |
| Water | 802.23 |
| Concentrated fruit juice | 177.84 |
| Fruit pulp cells, if desired | 5.41 |
| Calcium salt blend (75% by weight of tribasic calcium phosphate and 25% by weight of calcium lactate based upon total calcium) | 6.31 |
| Natural and/or artificial flavors | 0.19 |
| Total weight | 991.98 |

The preferred calcium fortified orange or citrus juice product also contains significant quantities of other essential nutrients including folic acid, thiamine and potassium. A comparison of the nutrients contained in ordinary orange juice and those contained in the preferred fortified orange juice of the present invention is set forth in Table II. Other than the properties mentioned above and the additional enrichment in phosphorus, the beverage of the invention is substantially similar to ordinary juice beverages.

TABLE II

Comparison of the Nutrient Content of Ordinary Orange Juice and an Example of a Calcium Fortified Orange Juice*

| Product | Vitamin C | Calcium | Potassium | Phosphorous | Thiamine | Folic Acid |
| --- | --- | --- | --- | --- | --- | --- |
| Orange Juice | 120 | 20 | 260 | 30 | 0.12 | 0.04 |
| Calcium Fortified Orange Juice | 120 | 320 | 260 | 130 | 0.12 | 0.04 |

*Ingredients are measured in mg per six fluid ounces.

A calcium fortified juice product manufactured in accordance with the present invention exhibits good solids distribution. It is desirable, however, to shake the product well in order to distribute pulp and other solids. It is also a characteristic of the calcium fortified orange juice of the present invention that the salt blend does not markedly increase sedimentation in spite of the well-known phenomenon of calcium citrate precipitation. Those undissolved materials which do form a sediment (usually natural citrus juice solids) can be readily redistributed throughout the juice by shaking or stirring before drinking. Accordingly, it is believed that the natural pectins present in standard orange or citrus juice serve as chelating or complexing agents to distribute and suspend the calcium salts. For those products made in accordance with the present invention that contain substantially little or no pectin and pulp at low viscosities, a stabilizer such as algin, pectin or dextrin may be incorporated to suspend the calcium salts.

Tables III-V set forth exemplary compositions of other forms of the calcium fortified food product of the present invention.

TABLE III

| Calcium Fortified 100% Juice Product-Frozen Concentrate | |
|---|---|
| Ingredients | Grams per 12 fluid ounces |
| Water | 139.49 |
| Concentrated fruit juice | 267.40 |
| Fruit pulp cells | 5.93 |
| Calcium salt blend (75% by weight tribasic calcium phosphate and 25% by weight calcium lactate based upon total calcium) | 11.16 |
| Natural and/or artificial flavors | 0.21 |
| Total weight | 424.19 |

TABLE IV

| Calcium Fortified 10% Juice Product - Ready-to-Serve Form | |
|---|---|
| Ingredients | Grams per quart |
| Water | 861.08 |
| Concentrated fruit juice | 17.95 |
| Sugar | 104.27 |
| Citric acid or equivalent | 2.14 |
| Vitamin C, if desired | 0.43 |
| Food color | 0.02 |
| Calcium salt blend (75% by weight calcium phosphate and 25% by weight calcium lactate based upon total calcium) | 5.41 |
| Total Weight | 991.30 |

TABLE V

| Calcium Fortified 60% Juice Product - Ready-to-Serve Form | |
|---|---|
| Ingredients | Grams per quart |
| Water | 826.92 |
| Concentrated fruit juice | 106.79 |
| Sugar | 48.89 |
| Citric acid or equivalent | 3.62 |
| Vitamin C, if desired | 0.17 |
| Food color | 0.10 |
| Calcium salt blend (75% by weight calcium phosphate and 25% by weight calcium lactate) | 6.46 |
| Natural flavors | 0.15 |
| Total Weight | 993.10 |

The invention will now be further illustrated by the following examples.

EXAMPLE I

Study of properties of Calcium Salts

A variety of calcium containing compounds were evaluated as possibilities for the salt blend of the present invention. Table VI lists the relative qualities of calcium in each of the compounds tested (calcium yield), solubility and color in water and taste in orange juice.

TABLE VI

Evaluation of Calcium Salts For Use as Calcium Supplement in Orange Juice

| Salt | % Calcium Content | Solubility/Color in Water | Taste in Orange Juice |
|---|---|---|---|
| Calcium acetate | 25.34 | Excellent/clear | Vinegary |
| Calcium ascorbate | 10.27 | Good/yellow | Slight medicinal |
| Calcium carbonate | 40.04 | Fair/milky | Seltzer, lemoney |
| Calcium chloride | 36.11 | Good/clear | Salty |
| Calcium citrate | 24.12 | Fair/milky | Tart, clean |
| Calcium gluconate | 9.31 | Excellent/clear | None - bland |
| Calcium glycerophosphate | 19.07 | Good/clear | Wallpaper Paste |
| Calcium hydroxide | 54.07 | Fair/milky | Flat |
| Calcium Lactate | 13.50 | Good/clear | None - bland |
| Calcium Oxide | 71.47 | Poor/cloudy | Bland, Sweet |
| Calcium Pantothenate | 8.41 | Good/clear | Tart, slightly salty |
| Calcium Phosphate, Dibasic | 29.46 | Fair/milky | Bland |
| Calcium Phosphate Monobasic | 17.12 | Fair/milky | Tangy |
| Calcium Phosphate, Tribasic | 38.76 | Fair/milky | Bland |

It was determined that the solubility of solids contained in a beverage manufactured in accordance with the present invention is dependent upon the calcium blend or individual calcium salt used. The calcium yield of each salt utilized varies slightly from batch to batch but an average yield could generally be expected and used in preparing formulations for manufacture. The addition of calcium to a standard single strength orange juice (11.8% to 12.0% soluble solids) increased the soluble solids to 12.2% to 13.7%, depending on the calcium salt selected and the enrichment level. Correspondingly, the soluble solids in frozen concentrated orange juice (about 41.8% soluble solids) increased to about 43.0% to 49.0% soluble solids, as based on the use of calcium carbonate (at 40.04% calcium content, the compound which was highest in calcium) and calcium gluconate (at 9.31% calcium content, the compound which was lowest in calcium) as single sources of calcium. As discussed below, it was found that a combination of tribasic calcium phosphate and calcium lactate provided the desired properties described above. Other salts either individually or in blends had harsh tastes, caused precipitates and/or masked the citrus juice flavor of the beverage being formulated. In each of the citrus beverages of the invention a highly desirable taste can be achieved by variation of the percentages of the two salts present so that the bland taste of one balances the tangy taste of the other.

Table VII illustrates the changes in orange juice when equivalent amounts of calcium are added, i.e., 300 mg of calcium per 6 fluid ounces.

TABLE VII

Orange Juice Properties Upon Addition of Calcium Salts*

| Salt | Grams of Calcium Salt/ 16 fl. oz. | Brix | Acid | Ratio | pH |
|---|---|---|---|---|---|
| Control | — | 11.90 | 0.75 | 16/1 | 3.80 |
| Calcium acetate | 3.16 | 12.50 | 0.76 | 16/1 | 4.35 |
| Calcium ascorbate | 7.79 | 13.70 | 0.76 | 18/1 | 4.17 |
| Calcium carbonate | 1.99 | 12.26 | 0.35 | 35/1 | 4.80 |
| Calcium chloride | 2.22 | 12.64 | 0.78 | 16/1 | 3.50 |
| Calcium citrate | 3.32 | 12.74 | 0.73 | 17/1 | 3.89 |
| Calcium glycerophosphate | 4.20 | 12.85 | 0.74 | 17/1 | 4.17 |
| Calcium hydroxide | 1.47 | 12.09 | 0.30 | 40/1 | 4.80 |
| Calcium lactate | 5.93 | 12.74 | 0.74 | 17/1 | 4.04 |

TABLE VII-continued
Orange Juice Properties Upon Addition of Calcium Salts*

| Salt | Grams of Calcium Salt/ 16 fl. oz. | Brix | Acid | Ratio | pH |
|---|---|---|---|---|---|
| Calcium oxide | 1.12 | 12.19 | 0.29 | 42/1 | 4.75 |
| Calcium pantothenate | 9.51 | 13.70 | 0.74 | 18/1 | 4.22 |
| Calcium phosphate, dibasic | 2.72 | 12.05 | 0.74 | 16/1 | 4.02 |
| Calcium phosphate, monobasic | 4.67 | 12.75 | 1.23 | 10/1 | 3.68 |
| Calcium phosphate, tribasic | 2.06 | 12.40 | 0.65 | 19/1 | 4.09 |

*Amount of salt calculated to provide 300 mg of calcium per six fluid ounces. Amount of acid is measured by standard alkali titration. The variation in acid content is due to the presence of neutralizing calcium salts.

Calcium carbonate was considered as a source of calcium. Its utilization in the invention, however, was considered unacceptable due to off-flavors, excessive foaming and effervescence during blending and an excessive increase in pH with a corresponding decrease in titrable acidity. In order to obtain sensory parity with standard orange juice, a blend of two or more calcium salts was necessary. Though strict flavor equivalency was not obtained due to changes in the pH and perceived sensory texture, very acceptable prototypes were developed varying in degrees in flavor difference from the control. The various calcium blends developed and their characteristics are presented in Table VIII.

TABLE VIII

| Calcium Salt Blends | Brix | Acid | Ratio | pH | Flavor |
|---|---|---|---|---|---|
| (% Calcium contribution from each salt) | | | | | |
| (65/35) Calcium phosphate, tribasic; calcium lactate | 12.37 | 0.68 | 18/1 | 4.28 | Good |
| (75/25) calcium phosphate, tribasic; calcium lactate | 12.4 | 0.68 | 18/1 | 4.32 | Very good |
| (80/20) calcium phosphate, tribasic; calcium phosphate, monobasic | 12.49 | 0.77 | 16/1 | 4.24 | Harsh |
| (72.5/27.5) calcium phosphate, tribasic; calcium phosphate, monobasic | 12.46 | 0.82 | 15/1 | 3.96 | Harsh |
| (75/25) calcium lactate; calcium carbonate | 12.8 | 0.59 | 21/1 | 4.09 | Foamed |

The blends containing tribasic and monobasic calcium phosphate were found to be possibly drinkable, but tended to add a harsh character to the flavor of the beverage. As previously discussed, even limited usage of calcium carbonate tended to cause excessive foaming and effervescence. When prescribed amounts of calcium carbonate were are to the concentrated orange juice product, the foaming was unacceptable and posed problems for industrial production.

The blend found to develope the desired flavor and taste characteristics, to facilitate preparation of beverages and to minimize cost was calcium phosphate (tribasic) and calcium lactate. The range of percent of total calcium for this blend is from about 50% to about 80% calcium phosphate and about 20% to about 50% calcium lactate. The preferred ratio range is from about 65% to about 75% by weight of the calcium from calcium phosphate and the remaining fraction of calcium (25% to 35% by weight) from calcium lactate. The pH of the calcium fortified orange juice helps maintain the product in the high acid condition. Calcium salts were blended so that the pH of the fortified juice product was less than 4.5 and the Brix-acid ratio was about 12.5:1 to about 20:1, (7:1 to 11:1 for grapefruit and other higher acid juices).

EXAMPLE II

Absorption Study

An experiment was conducted to determine the relative ability of the gut to absorb calcium from a calcium fortified orange juice produced in accordance with the present invention compared with that of milk. The bioavailability of calcium from orange juice fortified with a blend of tricalcium phosphate-calcium lactate was shown to be about equivalent to that of milk even though the orange juice contained no vitamin D.

The two orange juice samples used in the study contained a 75/25 weight percent blend (calcium basis) of tricalcium phosphate: calcium lactate; and a 80/20 weight percent blend (calcium basis) of tricalcium phosphate: monocalcium phosphate. Indirect measurements of intestinal calcium absorption expressed as increments in urinary calcium were made and the results are listed in Table IX.

TABLE IX

Indirect Measurement of Intestinal Calcium Absorption Expressed as Increment in Urinary Calcium (mg/100 ml glomerular filtrate)

| Subject | 2% Milk | 75/25 blend of tricalcium phosphate/ calcium lactate | 80/20 blend of tricalcium phosphate/ monocalcium phosphate |
|---|---|---|---|
| 1 | 0.076 | 0.037 | 0.049 |
| 2 | 0.136 | 0.164 | 0.111 |
| 3 | 0.059 | 0.058 | 0.019 |
| 4 | 0.040 | −0.042 | −0.050 |
| 5 | 0.113 | 0.083 | 0.022 |
| 6 | 0.006 | 0.152 | 0.049 |
| Mean | 0.072 | 0.075 | 0.033 |

No. of subjects: 6
Age range of subjects: 20–35
Sex of subjects: 4 females, 2 males
Calcium load: 500 mg of calcium given to each subject as oral calcium load (i.e., 10 ounces of calcium fortified orange juice; 11.5 ounces of 2% milk fat)
Duration of test: Single load (subjects were placed on a low calcium diet for a week, at the end of that period subjects ingested the calcium-fortified juice; urine was collected at pre-determined intervals and analyzed for calcium. The cycle was repeated and the bioavailability of calcium in the milk sample was TABLE IX-continued

| | | Indirect Measurement of Intestinal Calcium Absorption Expressed as Increment in Urinary Calcium (mg/100 ml glomerular filtrate) | |
|---|---|---|---|
| Subject | 2% Milk | 75/25 blend of tricalcium phosphate/ calcium lactate | 80/20 blend of tricalcium phosphate/ monocalcium phosphate |
| | | measured by analysis of urine samples). | |

It is to be understood that the invention is not limited to the illustration described and shown herein, which are deemed to be merely illustrative of the best modes of carrying out the invention. The invention also encompasses all such modifications which are within the scope of the following claims.

What is claimed is:

1. A calcium fortified beverage comprising:
  (a) water;
  (b) a concentrated fruit juice; and
  (c) a solubilized calcium component derive from a salt blend wherein 50%–80% by weight of total calcium is tribasic calcium phosphate and about 20%–50% by weight of total calcium is calcium lactate.

2. A calcium fortified beverage according to claim 1 wherein the amount of said salt blend substantially dissolved in said water and said fruit juice is sufficient to yield a single strength beverage containing between about 100 mg to about 1,000 mg of calcium per 6 fluid ounces.

3. A calcium fortified beverage according to claim 2 which has a pH as a single strength beverage of not more than about 4.5.

4. A calcium fortified beverage according to claim 3 having a Brix-acid ratio of from about 5:1 to about 54:1.

5. A calcium fortified beverage according to claim 4 wherein the Brix-acid ratio is from about 5:1 to about 20:1 and the fruit juice is a citrus juice.

6. The calcium fortified beverage of claim 1, further comprising fruit pulp cells and natural flavors.

7. A calcium fortified beverage according to claim 1, 2, 3, 4, 5 or 6 wherein the percentage of calcium from tribasic calcium phosphate is about 65–75% and percentage of calcium from calcium lactate is about 25–35%.

8. The calcium fortified beverage according to claim 7 wherein said percentages are about 75% tribasic calcium phosphate and about 25% calcium lactate.

9. The calcium fortified beverage of claim 1, 2, 3, 4, 5 or 6 further comprising a natural or artificial sweetening agent, Vitamin C and food colorings.

10. The calcium fortified beverage according to claim 1, 2, 3, 4, 5, or 6 wherein the fruit juice is a concentrated citrus fruit juice selected from the group consisting of orange juice, tangerine juice, lime juice, lemon juice, grapefruit juice and a blend of citrus juices.

11. The calcium fortified beverage of claim 1, 2, 3, 4, 5 or 6 wherein the fruit juice is orange juice and the Brix-acid ratio is about 12.5:1 to about 20:1.

12. A calcium fortified beverage comprising:
  (a) about 70%–97% by total beverage weight of water;
  (b) about 2%–28% by total beverage weight of concentrated fruit juice; and
  (c) a solubilized calcium component derived from about 1–5% by total beverage weight of a salt blend wherein 50%–80% by weight of total calcium is tribasic calcium phosphate and about 20%–50% by weight of total calcium is calcium lactate.

13. A beverage according to claim 12 wherein the amount of said salt blend substantially dissolved in said water and said fruit juice is sufficient to yield a single strength beverage containing about 250–350 mg of calcium per six fluid ounces.

14. A beverage according to claim 13 wherein the pH is not more than about 4.5.

15. A beverage according to claim 14 wherein the Brix-acid ratio is from about 5:1 to about 54:1.

16. A beverage according to claim 15 wherein the balance of said calcium fortified beverage includes fruit pulp cells and natural flavors.

17. A beverage according to claim 12, 13, 14, 15 or 16 wherein the percentage of calcium from tribasic calcium phosphate is about 65–75% and the percentage of calcium from calcium lactate is about 25–35%.

18. A beverage according to claim 17 wherein the water percentage is about 70–80%, the concentrate percentage is about 15–25% and the salt blend percentage is about 2–4%.

19. A beverage according to claim 17 wherein said percentages are about 75% calcium phosphate and about 25% calcium lactate.

20. The calcium fortified beverage of claim 12, 13, 14, 15 or 16, further comprising a natural or artificial sweetening agent, Vitamin C and food colorings.

21. The calcium fortified beverage of claim 12, 13, 14, 15 or 16, wherein the fruit juice is a concentrated citrus fruit juice selected from the group consisting of orange juice, tangerine juice, lemon juice, lime juice, grapefruit juice and a blend of citrus juices.

22. The calcium fortified beverage of claim 12, 13, 14, 15 or 16, wherein the citrus fruit juice is orange juice and the Brix-acid ratio is about 12.5:1 to about 20:1.

23. The calcium fortified beverage of claim 1 or 12, further comprising a stabilizer which suspends the salt blend in solution with said water and said fruit juice.

24. A calcium fortified frozen beverage concentrate comprising:
  (a) a mixture of water, concentrated fruit juice; and
  (b) a solubilized calcium derived from a salt blend wherein 50%–80% by weight of total calcium is tribasic calcium phosphate and about 20%–50% by weight of total calcium is calcium lactate, said beverage containing an amount of water and fruit juice concentrate sufficient so as to provide at least a double strength concentrate.

25. A concentrate according to claim 24 wherein said salt blend is substantially dissolved in said mixture of water and fruit juice to form a concentrate which can be frozen.

26. A concentrate according to claim 25 which upon addition of water and thawing, yields a single strength beverage containing between about 100 mg–1,000 mg of calcium per six fluid ounces.

27. A concentrate according to claim 26 which has a pH of not more than about 4.5 as a single strength beverage.

28. A concentrate according to claim 27 having a Brix to acid ratio of about 5:1 to about 54:1.

29. A concentrate according to claim 24, 25, 26, 27 or 28 wherein the percentage of calcium from tribasic calcium phosphate is about 65–75% and the percentage of calcium from calcium lactate is about 25–35%.

30. The calcium fortified frozen beverage concentrate of claim 24, 25, 26, 27 or 28 wherein the fruit juice concentrated citrus fruit juice is selected from the group consisting of orange juice, tangerine juice, lemon juice, lime juice and grapefruit juice.

31. The concentrate of claim 29 wherein said percentages are about 75% calcium phosphate and about 25% calcium lactate.

32. A calcium frozen beverage concentrate comprising:
  (a) about 95–98% by total beverage weight of a mixture consisting of about 20–30% by weight of water and about 66–80% by weight of concentrated fruit juices; and
  (b) a solubilized calcium component derived from about 2–5% by total beverage weight of a salt blend wherein 50%–80% by weight of total calcium by weight of total calcium, is tribasic calcium phosphate and about 20%–50% by weight of total calcium is calcium lactate.

33. A concentrate according to claim 32 wherein said salt blend is substantially dissolved in said mixture of water and fruit juice to form a concentrate which can be frozen.

34. A concentrate according to claim 33 which, upon addition of water and thawing and addition of water, yields a single strength beverage containing about 250–350 mg of calcium per six fluid ounces.

35. A concentrate according to claim 34 which has a pH of not more than about 4.5 as a single strength beverage.

36. A concentrate according to claim 35 having Brix-acid ratio of about 5:1 to about 54:1.

37. A concentrate according to claim 32, 33, 34, 35 or 36 wherein the percentage of calcium from tribasic calcium phosphate is about 65–75% and the percentage of calcium from calcium lactate is about 25–35%.

38. The calcium fortified frozen beverage concentrate of claim 32, 33, 34, 35 or 36 wherein the fruit juice is concentrated citrus fruit juice selected from the group consisting of orange juice, tangerine juice, lemon juice, lime juice and grapefruit juice.

39. The calcium fortified frozen beverage concentrate according to claim 32, 33, 34, 35 or 36 wherein the citrus fruit juice is orange juice and the Brix-acid ratio is about 12.5:1 to about 20:1.

40. The concentrate according to claim 37 wherein said percentages are about 75% calcium phosphate and about 25% calcium lactate.

41. A calcium fortified dry drink mix suitable for preparing a beverage, comprising:
  (a) fruit juice solids; and
  (b) a salt blend wherein 50%–80% by weight of tribasic calcium phosphate and about 20%–50% by weight of the total calcium in the blend is calcium lactate.

42. A dry drink mix according to claim 41 wherein said salt blend being mixed with said fruit juice solids to form a dry mix which upon reconstitution with water, yields a single strength beverage containing between about 100 mg–1,000 mg of calcium per six fluid ounces.

43. A dry drink mix according to claim 42 which has a pH of not more than 4.5 as a single strength beverage.

44. A dry drink mix according to claim 43 having a Brix-acid ratio of about 5:1 to 54:1.

45. A dry drink mix according to claim 44 wherein the percentage of calcium from tribasic calcium phosphate is about 65–75% and the percentage of calcium from calcium lactate is about 25–35%.

46. The calcium fortified dry drink mix of claim 41, 42, 43, 44 or 45 wherein the fruit juice solids are citrus solids selected from the group consisting of dried oranges, tangerine, limes, lemons, grapefruits and mixtures thereof.

47. The calcium fortified dry drink mix of claim 41, 42, 43, 44 or 45 wherein the citrus solids are produced from oranges and the Brix-acid ratio is about 12.5:1 to about 20:1.

48. The mix of claim 45 wherein said percentages are about 75% calcium phosphate and about 25% calcium lactate.

* * * * *

UNITED STATES PATENT AND TRADEMARK OFFICE
CERTIFICATE OF CORRECTION

PATENT NO. : 4,871,554

DATED : October 3, 1989

INVENTOR(S) : Rose H. Kalala, Joe R. DeLeon and Thomas P. Maculan

It is certified that error appears in the above-identified patent and that said Letters Patent is hereby corrected as shown below:

Column 4, line 38, change "50%-0% to --50%-80%.

Column 9, line 48, change "possibly" to --passibly--; line 53, change "are" to --added--.

Column 11, line 21, change "derive" to --derived--.

Column 13, line 15, change "juices" to --juice--.

In the Abstract, line 4, after the second occurrence of "of", delete --a--.

Signed and Sealed this

Fifth Day of February, 199

*Attest:*

HARRY F. MANBECK, JR.

*Attesting Officer*      *Commissioner of Patents and Trademarks*